(12) United States Patent
Maeda

(10) Patent No.: US 6,503,554 B1
(45) Date of Patent: Jan. 7, 2003

US006503554B1

(54) METHOD FOR PREPARING BEVERAGES CONTAINING POWDERED TEA USING A STEAMER

(75) Inventor: Hiroshi Maeda, Newport Beach, CA (US)

(73) Assignee: Green Tea Terrace, Inc., Irvine, CA (US)

( * ) Notice: Subject to any disclaimer, the term of this patent is extended or adjusted under 35 U.S.C. 154(b) by 0 days.

(21) Appl. No.: 09/710,871

(22) Filed: Nov. 13, 2000

(51) Int. Cl.[7] ............................... A23F 3/00; A23F 3/16
(52) U.S. Cl. ...................... 426/597; 426/511; 426/433; 426/435
(58) Field of Search ................................ 426/597, 511, 426/435, 433

(56) References Cited

U.S. PATENT DOCUMENTS 5,154,111 A * 10/1992 Luciano
5,612,079 A * 3/1997 Lunder
5,895,672 A * 4/1999 Cooper

FOREIGN PATENT DOCUMENTS

WO    WO 98/56286    * 12/1998

OTHER PUBLICATIONS

Database Abstract for DE 19545112. Derwent–Acc–No: 1997–299383. Inventors: Herz et al., Jun. 1999.*

* cited by examiner

*Primary Examiner*—Anthony J. Weier
(74) *Attorney, Agent, or Firm*—Knobbe, Martins, Olson & Bear LLP

(57) ABSTRACT

A method of making a tasty beverage from powdered tea prepared by heating and foaming a preparation obtained by adding powdered tea to water or milk, etc., using a steam-jet supplied by a steamer of, for instance, a coffee espresso machine.

8 Claims, No Drawings

METHOD FOR PREPARING BEVERAGES CONTAINING POWDERED TEA USING A STEAMER

BACKGROUND OF THE INVENTION

1. Field of the Invention

The present invention relates to a method for preparing beverages and more particularly to a method for preparing beverages made of powdered tea.

2. Prior Art

Tea is a beverage that has been enjoyed by many people including the Japanese since ancient times. In recent years, however, the components of tea have been scientifically studied, and it has been ascertained that tea is very good for the health of human beings.

In order to insure effective ingestion of the active components of tea that is good for the health, it is desirable that the tea leaves themselves be ingested. For this purpose, the use of powdered tea, which is prepared by processing tea leaves "as is", is ideal.

Powdered tea is also used in confections and cooking. However, in cases where powdered tea is used as a beverage, a tea whisk, etc. used in the tea ceremony is required. Accordingly, the persons partaking of such beverages, and the locations where such beverages are enjoyed, tend to be limited.

SUMMARY OF THE INVENTION

Accordingly, the object of the present invention is to make it possible for anyone to prepare beverages using powdered tea, which is considered good for the health, in a short time and in a hygienic manner, and further to facilitate commercial preparation of such beverages in locations such as tea shops, etc.

In order to accomplish the above—object, in the present invention the steamer of an espresso coffee machine is used to agitate and foam a liquid containing powdered tea and water or milk, etc., while this liquid is heated.

Espresso coffee machines are installed in tea shops and espresso cafes, and are widely used commercially. Furthermore, small machines of this type may also be installed in common households. In the present invention, any type of espresso machine can be used which was previously used only for the preparation of coffee beverages.

More specifically, the present invention provides an easy preparation of tasty beverages that contain powdered tea by way of using the steamer of an espresso coffee machine that has been used only for coffee in the past.

DETAILED DESCRIPTION OF THE PREFERRED EMBODIMENTS

The present invention will be described below with reference to embodiments.

First, an appropriate amount of powdered tea is put in a container which contains a liquid such as water, milk, etc. In this case, the powdered tea is more easily dissolved if the powered tea is added to the liquid, rather than adding the liquid to the powdered tea.

Next, the power supply of an espresso coffee machine is switched on, so that steam (or steam-jet) is emitted. The concentration of the steam is adjusted so that an appropriate temperature is obtained, and foaming is performed by applying the steam (or steam-jet) for a predetermined period of time throughout the entire body of the liquid that contains the powdered tea in the container. In this case, complete foaming can be accomplished when the container is kept tilted so that the steam reaches the deep part or near the bottom of the container. After this, the beverage is transferred to a cup for drinking.

Examples of the beverages of the present invention will be described below in a more detailed manner.

First, the method used to prepare a single size serving for one person will be described.

(1) One teaspoon, i.e., approximately 1 g, of powdered tea is added to a container containing approximately 60 cc of water.

(2) The powdered tea is foamed by operating the steamer of an espresso coffee machine for seven (7) seconds at a temperature of 65° C., with the container tilted so that the steam-jet reaches the bottom of the container and agitate the water containing the powdered tea.

(3) The beverage is transferred to a cup.

A double size serving for a single person is prepared in the following manner:

(1) Two teaspoons, i.e., approximately 2 g, of powdered tea is added to a container containing approximately 90 cc of water.

(2) The powdered tea is foamed by operating the steamer of an espresso coffee machine for seven (7) seconds at a temperature of 65° C., with the container tilted so that the steam-jet reaches the bottom of the container and agitates the water that contains the powdered tea.

(3) The beverage is transferred to a cup.

Milk may be added to the powdered tea instead of water, and a well-foamed tasty beverage containing powdered tea can also be prepared by adding milk, sugar, chocolate syrup, honey, etc. to the above-described water.

A tasty beverage may also be obtained by adding ice to the finished beverage containing powdered tea, so that the beverage is cooled and iced beverage is produced.

As seen from the above, the present invention provides a simple, hygienic and quick preparation of a beverage that contains powdered tea using conventional equipment. Furthermore, since the method of preparation can be described in a manual, the method of the present invention is suitable for wide commercial use in, for instance, tea shops.

What is claimed is:

1. A method for preparing green tea comprising:

placing a liquid in a container, placing a serving of powdered green tea in said container with said liquid, and directing a stream of water vapor into said container so as to heat and mix said serving of powdered green tea and said liquid.

2. The method of claim 1, wherein said serving of powdered green tea has a mass of approximately one gram.

3. The method of claim 1, wherein said liquid added to said container occupies a volume of approximately 60 cubic centimeters.

4. The method of claim 1, wherein said liquid added to said container is water.

5. The method of claim 1, wherein said liquid added to said container is milk.

6. The method of claim 1, wherein said stream of water vapor is directed into said container for approximately seven seconds.

7. The method of claim 1, wherein said stream of water vapor is supplied by a steamer of a coffee espresso machine.

8. A method of preparing green tea comprising:

placing approximately 60 cubic centimeters of water in a container;

placing approximately 1 gram of fresh powdered green tea in said container with said water;

directing a stream of water vapor into said container for approximately seven seconds at an angle with respect to said container so as to heat and mix said fresh powdered green tea and said water; and transferring contents of said container to a cup for drinking.

\* \* \* \* \*